United States Patent [19]

Nakagawa et al.

[11] Patent Number: 4,644,389
[45] Date of Patent: Feb. 17, 1987

[54] DIGITAL TELEVISION SIGNAL PROCESSING CIRCUIT

[75] Inventors: Masaki Nakagawa, Yokohama; Susumu Suzuki, Kawasaki, both of Japan

[73] Assignee: Kabushiki Kaisha Toshiba, Kawasaki, Japan

[21] Appl. No.: 706,390

[22] Filed: Feb. 27, 1985

[30] Foreign Application Priority Data

Feb. 29, 1984 [JP] Japan .................................. 59-35936

[51] Int. Cl.$^4$ .............................................. H04N 9/78
[52] U.S. Cl. ......................................... 358/28; 358/31
[58] Field of Search ................................... 358/28, 31

[56] References Cited

U.S. PATENT DOCUMENTS

| | | | |
|---|---|---|---|
| 4,343,017 | 8/1982 | Wilkinson | 358/31 |
| 4,466,016 | 8/1984 | Pritchard | 358/31 |
| 4,470,069 | 9/1984 | Lewis | 358/31 |
| 4,500,912 | 2/1985 | Bolger | 358/31 |
| 4,524,423 | 6/1985 | Acampora | 358/31 |

Primary Examiner—Michael A. Masinick
Attorney, Agent, or Firm—Cushman, Darby & Cushman

[57] ABSTRACT

An analog video signal of a PAL system is converted into a digital video signal by an A/D converter. The digital video signal is supplied to a delay device so as to be subjected to hue correction and Y/C separation. The delay device generates a plurality of digital video signals with different delay times. The digital video signals S1(t) and S2(t) obtained from the delay device are supplied to a first subtracter, and the digital video signals S3(t) and S4(t) are supplied to a second subtracter. The outputs from the first and second subtracters are supplied to a third subtracter, and the output from the third subtracter is multiplied with a coefficient, thereby obtaining a first chrominance signal U(t). The outputs from the first and second subtracters are supplied to a first adder, and the output from the first adder is multiplied with a coefficient, thereby obtaining a second chrominance signal V(t).

11 Claims, 16 Drawing Figures

| t | (n-3)TS | (n-2)TS | (n-1)TS | nTS | (n+1)TS | (n+2)TS | (n+3)TS |
|---|---|---|---|---|---|---|---|
| $S_1(t)=D_1$ | $-U+y_{n-3}$ | $V+y_{n-2}$ | $U+y_{n-1}$ | $-V+y_n$ | $-U+y_{n+1}$ | $V+y_{n+2}$ | $U+y_{n+3}$ |
| $S_2(t)=D_2$ | $V+y_{n-3}$ | $-U+y_{n-2}$ | $-V+y_{n-1}$ | $U+y_n$ | $V+y_{n+1}$ | $-U+y_{n+2}$ | $-V+y_{n+3}$ |
| $S_3(t)=D_3$ | $-U+y_{n-2}$ | $-V+y_{n-1}$ | $U+y_n$ | $V+y_{n+1}$ | $-U+y_{n+2}$ | $-V+y_{n+3}$ | $U+y_{n+4}$ |
| $S_4(t)=D_5$ | $-V+y_{n-2}$ | $-U+y_{n-1}$ | $-V+y_n$ | $U+y_{n+1}$ | $-V+y_{n+2}$ | $-U+y_{n+3}$ | $V+y_{n+4}$ |
| U(t) | $U$ | $-U$ | $-U$ | $U$ | $U$ | $-U$ | $-U$ |
| V(t) | $V$ | $-V$ | $-V$ | $V$ | $V$ | $-V$ | $-V$ |
| C(t) | $V$ | $-U$ | $-V$ | $U$ | $V$ | $-U$ | $-V$ |

DIGITAL TELEVISION SIGNAL PROCESSING CIRCUIT

BACKGROUND OF THE INVENTION

The present invention relates to a digital television receiver and, more particularly, to a digital television signal processing circuit with improved hue correction of PAL signals.

Signal processing in a conventional television receiver is performed in an analog manner. However, there are problems with analog signal processing after image detection, such as poor luminance signal/chrominance signal separation (to be referred to as Y/C separation hereinafter) which appears as cross-color dots on a screen, poor image quality, and poor synchronization. These problems are caused by phase shifting among various signals along the time base, which is a common drawback with analog signal processing circuits. Meanwhile, when an integrated circuit is used, there is an increase in the number of external parts and portions to be adjusted. Therefore, the manufacturing process is more complicated, and the cost is increased.

In order to resolve these problems, video detection signals can be digitally processed after the video signals have been detected.

A PAL hue correction circuit using a 1-horizontal period (to be referred to as 1H hereinafter) delay line is installed in a television receiver of a PAL system. In a signal processing system of a transmission or a television receiver, the PAL hue correction circuit corrects hue distortions occurring in a video signal by a calculation using line correlation. More specifically, a chrominance signal of the PAL system is precisely separated into U and V signals using a comb filter. The comb filter comprises a 1H delay line and a calculator and can separate a chrominance signal having a frequency of $f=(n\pm\frac{1}{4})fH$ (where fH is a horizontal scanning frequency) near a subcarrier frequency into a U signal having a frequency of $f=(n-\frac{1}{4})fH$ and a V signal having that of $f=(n+\frac{1}{4})fH$. (where n is an indicated integer).

As described above, a television receiver of the PAL system is provided with a hue correction circuit. In addition, the television receiver is also provided with a Y/C separation circuit. Y/C separation circuits are classified into those which separate by using a normal band-pass filter and those which use a comb filter. The latter circuit is known to have superior performance. In the comb filter in the signal processing circuit of the PAL system, the chrominance signal has a frequency of $f=(n\pm\frac{1}{4})fH$. For this reason, if only one 1H delay line is used, it is difficult to perform Y/C separation. Thus, the comb filter is realized by using two 1H delay lines. When the comb filter of this type is used, cross-color interference can be reduced, thereby obtaining an image with high resolution.

As described above, in a television receiver of the PAL system, in order to improve performance, one 1H delay line for the hue correction circuit and two 1H delay lines for the Y/C separation circuit are required, that is, three 1H delay lines are needed. However, the 1H delay line is larger and more expensive than other components. Therefore, if three 1H delay lines are provided, the signal processing circuit becomes relatively expensive.

SUMMARY OF THE INVENTION

The present invention is made in consideration of the above situations and has as its object to provide a digital television signal processing circuit in which a multi-function comb filter using two 1H delay lines is provided, thus eliminating the need for a 1H delay line for a hue correction circuit and reducing the overall cost.

In order to achieve the above object, there is provided a television signal processing circuit according to the present invention, comprising:

an analog/digital converter for converting an analog video signal into a digital video signal, the analog-digital converter sampling the analog video signal at a predetermined period (Ts) and at a timing in synchronism with $\pm U$ and $\pm V$ phases so as to convert it into a digital video signal at least when an analog video signal of a PAL system is supplied thereto;

a delay device for delaying the digital video signal, the delay device being connected to the analog/digital converter and generating a maximum delay signal which is delayed by at least two horizontal scanning periods in units of the predetermined periods (Ts);

a first filter circuit for outputting a first chrominance signal Cu obtained by calculation and coefficient multiplication, which is coupled to a plurality of portions of the delay device and receives a plurality of digital video signals therefrom, each having different delay times, the first filter circuit calculating and coefficient-multiplying the plurality of digital video signals, and a frequency characteristic Fu(f) satisfying Fu(fsc)=Ku, and Fu{fsc+($\frac{1}{2}$)fH}=0, Fu{fsc+($\frac{1}{4}$)fH}=0 (where fH is a horizontal scanning frequency, Ku is a constant which is not zero, and fsc is a color subcarrier frequency); and a second filter circuit for outputting a second chrominance signal Cv obtained by calculation and coefficient multiplication, which is coupled to a plurality of portions of the delay device and receives a plurality of digital video signals therefrom, each having different delay times, the second filter circuit calculating and coefficient-multiplying the plurality of digital video signals, and a frequency characteristic Fv(f) satisfying Fv(fsc)=0, Fv{fsc+($\frac{1}{2}$)fH}=Kv, and Fv{fsc+($\frac{1}{4}$)fH}=0 (where Kv is a constant which is not zero).

DETAILED DESCRIPTION OF THE PREFERRED EMBODIMENTS

Embodiments of the present invention will be described hereinafter with reference to the accompanying drawings.

Figure 1:
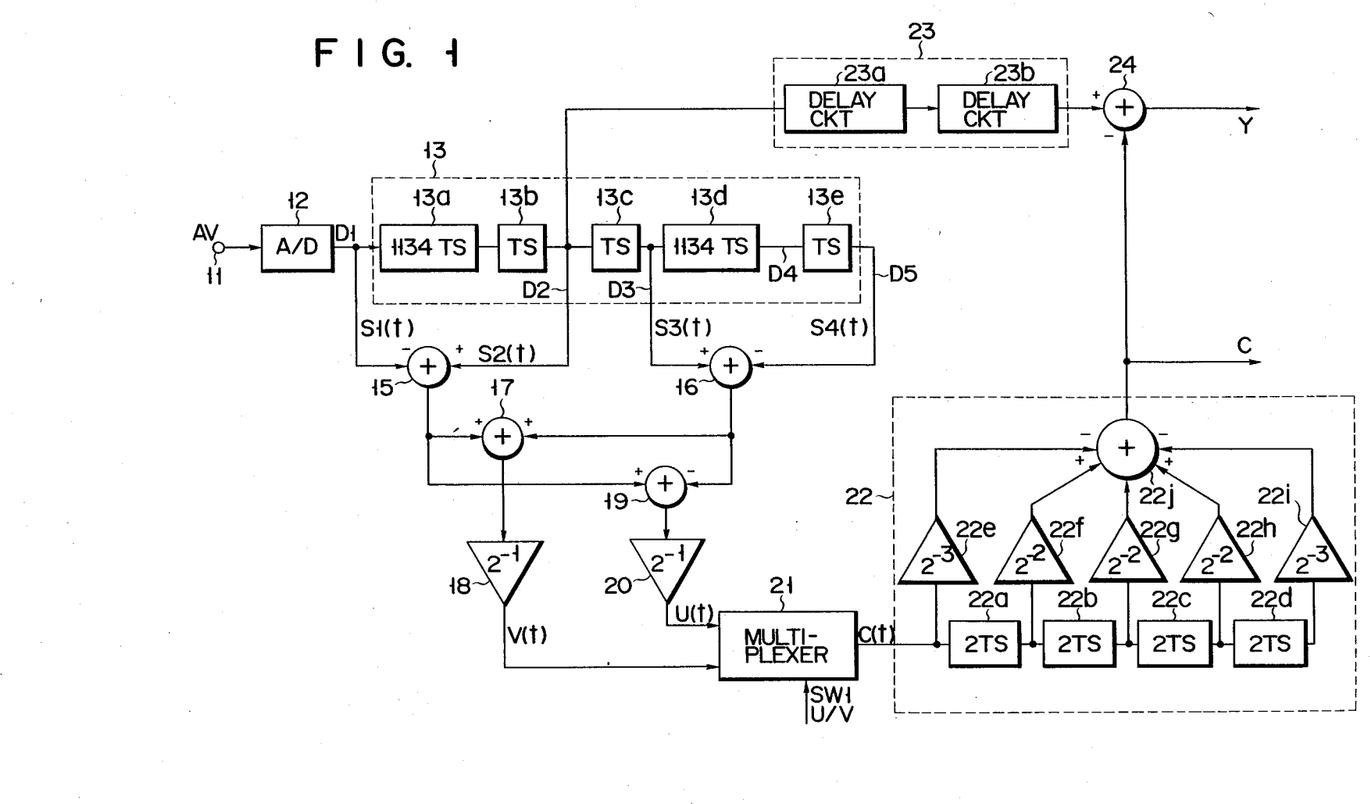
FIG. 1 is a block diagram of an embodiment of the present invention.

In FIG. 1, reference numeral 11 denotes an input terminal of an analog video signal AV, which is connected to an analog/digital (A/D) converter 12. In the A/D converter 12, the analog video signal AV is sampled by a sampling clock having a period of Ts (Ts=¼fsc) (fsc; a color subcarrier frequency) and is converted into a quantized digital video signal D1. A current sampling phase coincides with ±U and ±V axis phases of a color burst. The digital video signal D1 is supplied to a delay device 13. The delay device 13 comprises a series circuit of delay circuits 13a to 13e. The delay circuits 13a and 13d respectively have a delay time of 1134Ts, and the delay circuits 13b, 13c and 13e all have a delay time of Ts. The delay circuits 13a and 13b of the device 13 have a delay time of one horizontal scanning line period (to be referred to as 1H hereinafter).

The delay device 13 generates delay video signals D2, D3, D4 and D5 which are respectively delayed by 1135Ts, 1136Ts, 2270Ts (1135×2Ts) and 2271Ts with respect to the video signal D1.

The video signals D1 and D2 are supplied to a subtracter 15, and the video signals D3 and D5 are supplied to a subtracter 16. The results from the subtracters 15 and 16 are supplied to an adder 17, and the output from the adder 17 is supplied to a coefficient multiplier 18. The results from the subtracters 15 and 16 are also supplied to a subtracter 19, and the output from the subtracter is supplied to a coefficient multiplier 20. The outputs from the coefficient multipliers 18 and 20 are respectively V and U signals and are supplied to a multiplexer 21. The multiplexer 21 selectively calculates one of the V and U signals so as to generate a chrominance signal C(t) which is subjected to PAL hue correction.

Figure 2:
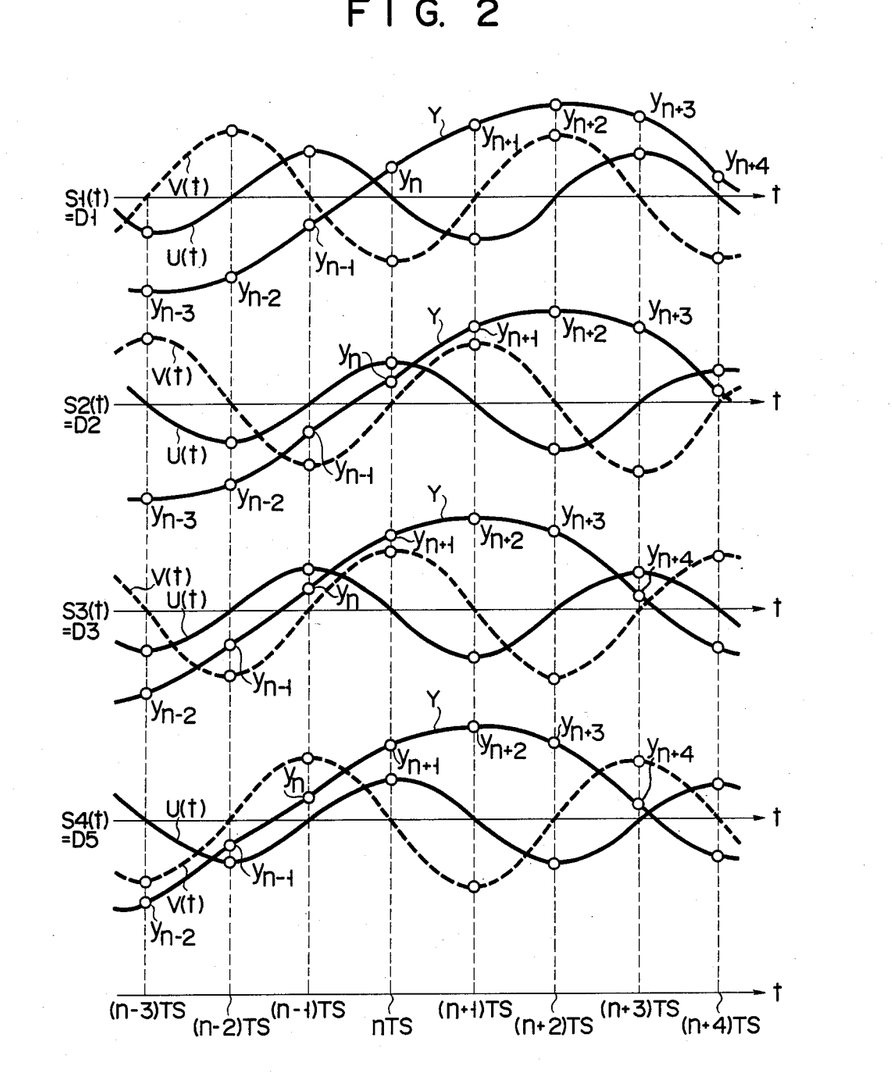
FIG. 2 is a view showing signal phases of respective portions for explaining an operation of a chrominance signal separation filter of the circuit shown in FIG. 1.
Figure 3:
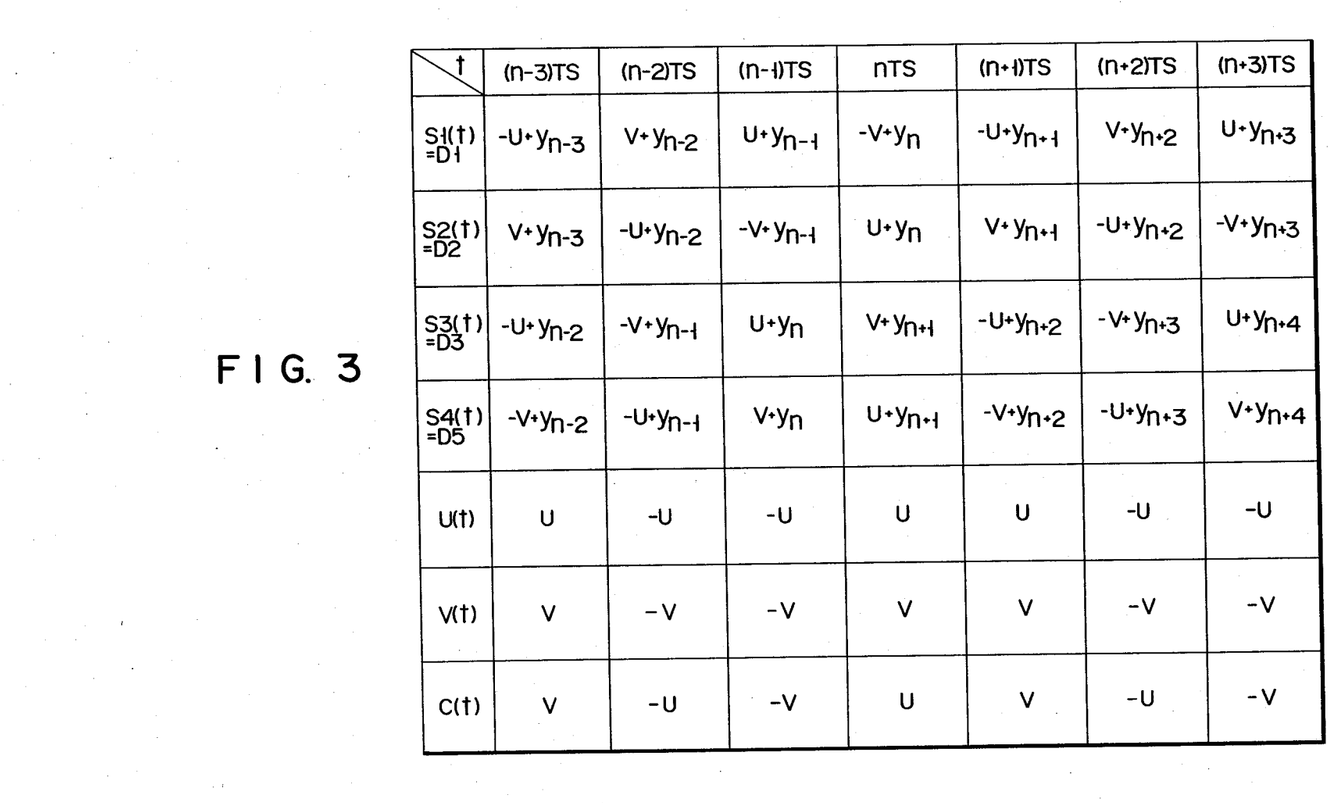
FIG. 3 is a table of a sampling signal for explaining the operation of the chrominance signal separation filter of the circuit shown in FIG. 1.

FIG. 2 shows changes over time of the video signals D1, D2, D3 and D5, and FIG. 3 is a view for explaining a process for obtaining the chrominance signal C(t) upon operation of the comb filter.

In FIG. 2, time is plotted along the abscissa, and reference symbols Y denote a luminance signal; V(t), the V signal; and U(t), the U signal. In FIG. 2, the digital video signals D1, D2, D3 and D5 are indicated as functions S1(t), S2(t), S3(t) and S4(t) which represent respective signals with reference to the function S2(t). An amplitude of the luminance signal Y is defined by time points $(n-3)Ts, (n-2)Ts, \ldots, nTs, (n+1)Ts, (n+2)Ts, \ldots, (n+4)Ts$ which are shifted by ¼ the wavelength, respectively. These signals can be represented in a table form, as shown in FIG. 3. At the time point $(n-3)Ts$, in the V signal system, since $-S1(t) +S2(t) +S3(t) -S4(t)$ is calculated, $(-U+Y_{n-3})+(-V+Y_{n-3})+U+Y_{n-2}-(-V+Y_{n-2})=2V$ is established, and this result is multiplied by ½ by the coefficient multiplier 18. As a result, the V signal is obtained. The V signals V(t) and U signals U(t) are as shown in FIG. 3. Among these signals, the U or V signal is alternately and selectively derived by the multiplexer 21 as the chrominance signal C(t). In other words, the U and V signals can be obtained by the following equations, and are alternately derived by the multiplexer 21:

$$U(t) = (\tfrac{1}{2})\{-S1(t) + S2(t) - S3(t) + S4(t)\} \quad \ldots (1)$$

$$V(t) = (\tfrac{1}{2})\{-S1(t) + S2(t) + S3(t) - S4(t)\} \quad \ldots (2)$$

The chrominance signal which is generated by the filter in the above manner is obtained by using the U and V signals which are obtained by line correlation along a vertical direction, thus performing PAL hue correction. Therefore, when the chrominance signal C(t) is demodulated, the U and V signals can be separated by a signal synchronized with a select signal SW1 which controls the multiplexer 21.

The calculations represented by above equations (1) and (2) denote a filter operation for obtaining U(t) and V(t), respectively.

Transfer functions Hu-comb(Z) and Hv-comb(Z) of the comb filter portion for generating the U signal U(t) and the V signal V(t) are respectively given as follows:

$$\begin{aligned}
Hu\text{-}comb(Z) &= (\tfrac{1}{2})\{(-1 + Z^{-TH/TS}) - Z^{-1}(Z^{-TH/TS} - Z^{-2TH/TS})\} \\
&= (\tfrac{1}{2})(-1 + Z^{-TH/TS})(1 + Z^{-(1+TH/TS)}) \\
Hv\text{-}comb(Z) &= (\tfrac{1}{2})\{(-1 + Z^{-TH/TS}) + Z^{-1}(Z^{-TH/TS} - Z^{-2TH/TS})\} \\
&= (\tfrac{1}{2})(-1 + Z^{-TH/TS})(1 - Z^{-(1+TH/TS)})
\end{aligned}$$

(where TH=1115Ts ... PAL system, TH=910Ts ... NTSC system)

Figure 4A:
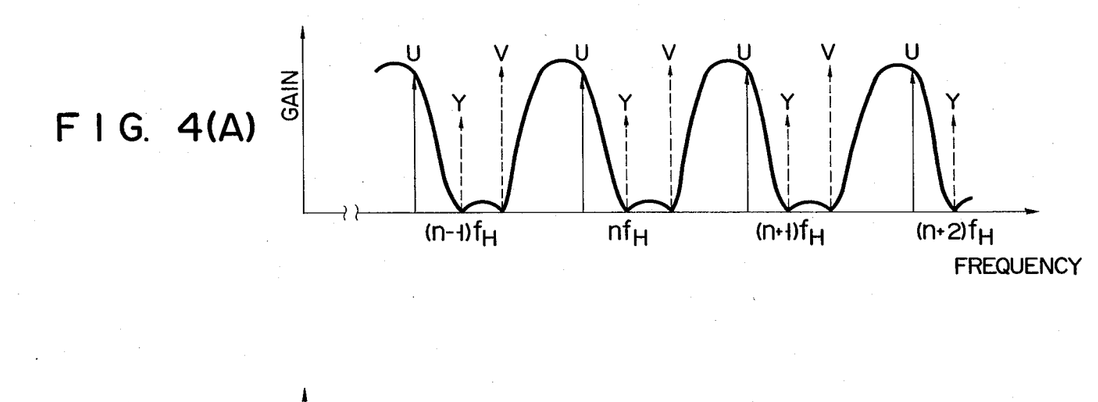
FIGS. 4(A) and 4(B) are graphs showing frequency characteristics of a comb filter portion of the circuit in FIG. 1.
Figure 4B:
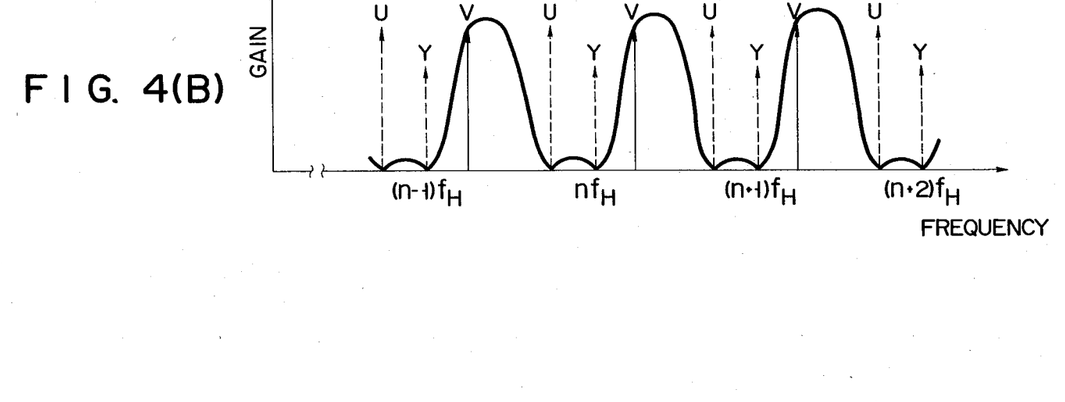

The frequency characteristics are as shown in FIGS. 4(A) and 4(B).

The separated U and V signals are again derived by the multiplexer 21 as the chrominance signal and generated through a band-pass filter 22. This means that the chrominance signal C which is subjected to PAL hue correction is further separated from the digital video signal. As a result, Y/C separation is performed. This is performed by supplying the video signal D2 to an adjusting circuit 23 comprising a series circuit of a plurality of (two in this case) delay circuits 23a and 23b so as to align a time base phase thereof with that of the chrominance signal C, and thereafter, is supplied to a subtracter 24. The subtracter 24 also receives the chrominance signal C from the band-pass filter 22. Therefore, the luminance signal Y from which the chrominance signal C is removed can be obtained from the subtracter 24.

The relationship between characteristics of the comb filter portion consisting of the delay device 13, the subtracters 15, 16 and 19, the adder 17, the coefficient multipliers 18 and 20 and the like, and the sampling theorem will be described hereinafter.

Figure 5A:
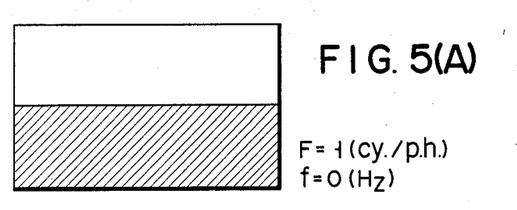
FIGS. 5(A), 5(B) and 5(C) are diagrams for explaining a correspondence between a two-dimensional frequency and an image on screen.
Figure 5B:
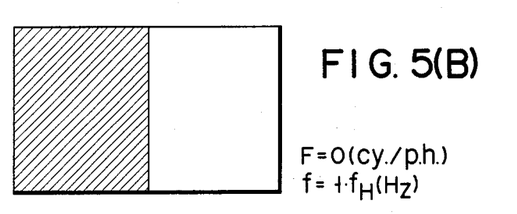
Figure 5C:
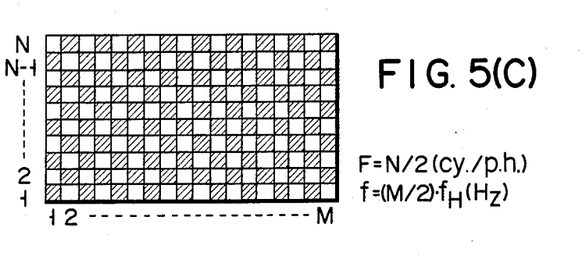

Hereafter a vertical frequency represents the extent of change in an image along a vertical direction of the screen, and uses cycle/picture height (to be referred to as cy./p.h. hereinafter) as a unit of measurement. FIGS. 5(A), 5(B) and 5(C) show the relationship between the vertical frequency F(cy./p.h.), a generally used frequency f(Hz) (to be referred as to a horizontal frequency hereinafter so as to distinguish it from the vertical frequency F) and the images they produce.

When an image is a pair of black and white patterns divided in a vertical direction with respect to a screen as shown in FIG. 5(A), the vertical frequency thereof is defined as a unit frequency 1 (cy./p.h.). Similarly, when the image is a pair of black and white patterns divided in a horizontal direction as shown in FIG. 5(B), the horizontal frequency thereof is defined as a unit horizontal frequency 1 fH(Hz). A frequency which is a combination of the vertical and horizontal frequencies is called a two-dimensional frequency. When the frequencies are defined as described above, the image shown in FIG. 5(C) has N/2 pairs of black and white patterns (N is a positive integer) with respect to the vertical direction. Therefore, the vertical frequency of this image is N/2 (cy./p.h.). With respect to the horizontal direction, since the image has M/2 pairs of black and white patterns (M is a positive integer), the horizontal frequency is M/2 fH(Hz).

Figure 6:
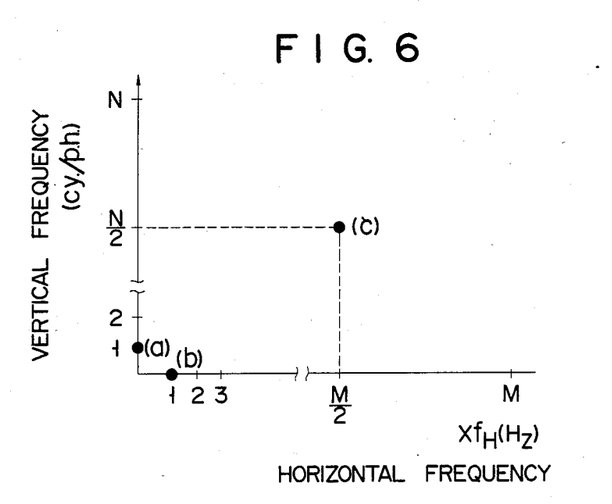
FIG. 6 is a graph where the images shown in FIGS. 5(A), 5(B) and 5(C) are plotted.

When FIGS. 5(A), 5(B) and 5(C) are represented by a two-dimensional frequency by plotting the vertical frequency along the ordinate and the horizontal frequency along the abscissa, they can be represented as shown in FIG. 6. Note that reference symbols (a), (b) and (c) in FIG. 6 respectively correspond to FIGS. 5(A), 5(B) and 5(C).

In the two-dimensional frequency defined in one field, assume that the scanning line number of one field is defined as N (e.g., N=625/2 in the PAL system or N=525/2 in the NTSC system). In this case, the finest image along the vertical direction is a stripe pattern in which each scanning line alternates between black and white. The vertical frequency of this image is N/2 (cy./p.h.), as is apparent from FIG. 5(C). In other words, the highest vertical frequency in one field with respect to the scanning line number N is N/2 (cy./p.h.). Therefore, the scanning line number N is the sampling frequency N (cy./p.h.) along the vertical direction, and the image having a vertical frequency of more than N/2 (cy./p.h.) becomes an image folded at a vertical frequency F=N/2 (cy./p.h.). For example, in an image having a vertical frequency F=3N/4 (cy./p.h.), the image is folded at a frequency F=N/2 (cy./p.h.) and is equivalent to that having a frequency F=N/4 (cy./p.h.). This is the sampling theorem along the axis of vertical frequency.

In accordance with the sampling theorem, when equation (3) of the chrominance signal separation circuit in the above comb filter portion is rewritten in the two-dimensional frequency manner, the transfer functions thereof are given as follows:

$$Hu\text{-}comb(\omega,Z) = (\tfrac{1}{2}^2)\{(-1+\omega^{-1}) - Z^{-1}(\omega^{-1} - \omega^{-2})\} \quad (4)$$
$$= (\tfrac{1}{2}^2)(-1+\omega^{-1})(1+Z^{-1}\omega^{-1})$$

$$Hv\text{-}comb(\omega,Z) = (\tfrac{1}{2}^2)\{(-1+\omega^{-1}) + Z^{-1}(\omega^{-1} - \omega^{-2})\} \quad (5)$$
$$= (\tfrac{1}{2}^2)(-1+\omega^{-1})(1-Z^{-1}\omega^{-1})$$

where $\omega^{-1}$ is a 1H delay operator, $\omega^{-1}=\exp(-2\pi F/Fs)=Z^{-TH/TH}$, and Fs is the sampling frequency along the axis of vertical frequency.

Figure 7:
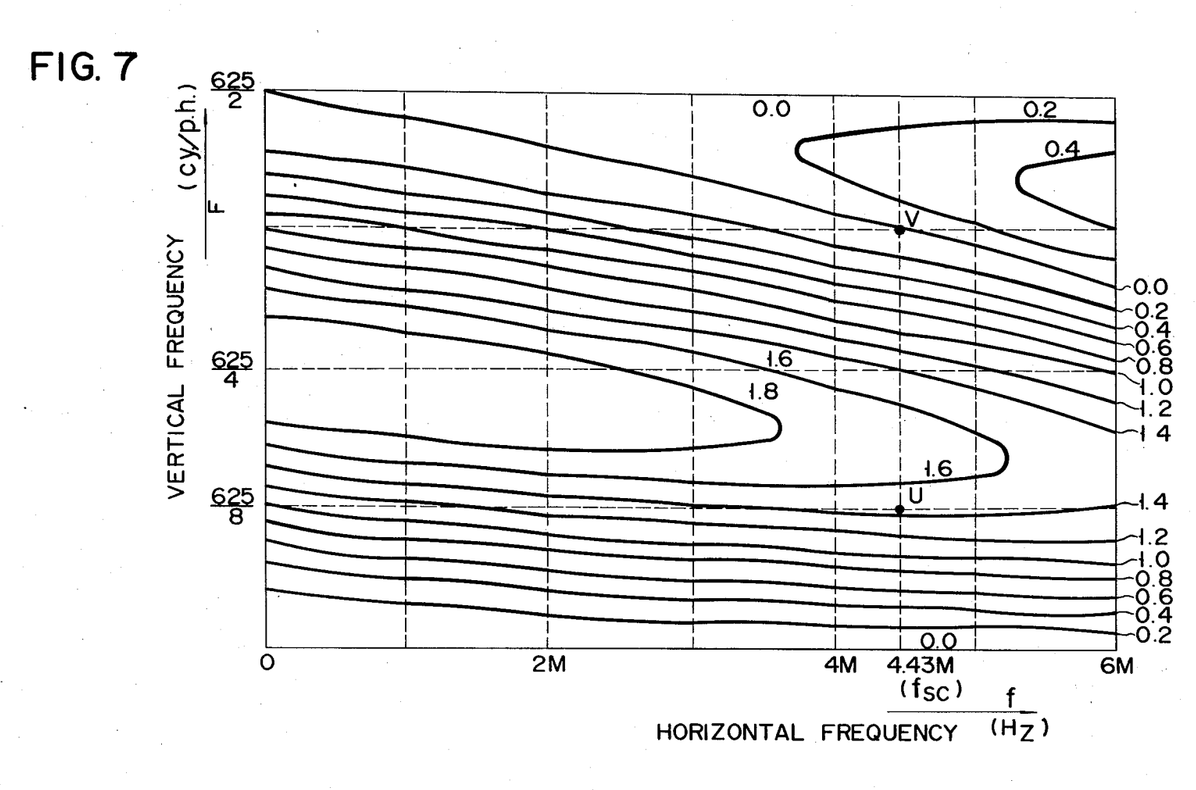
FIGS. 7 and 8 are graphs showing frequency characteristics of the circuit in FIG. 1.
Figure 8:
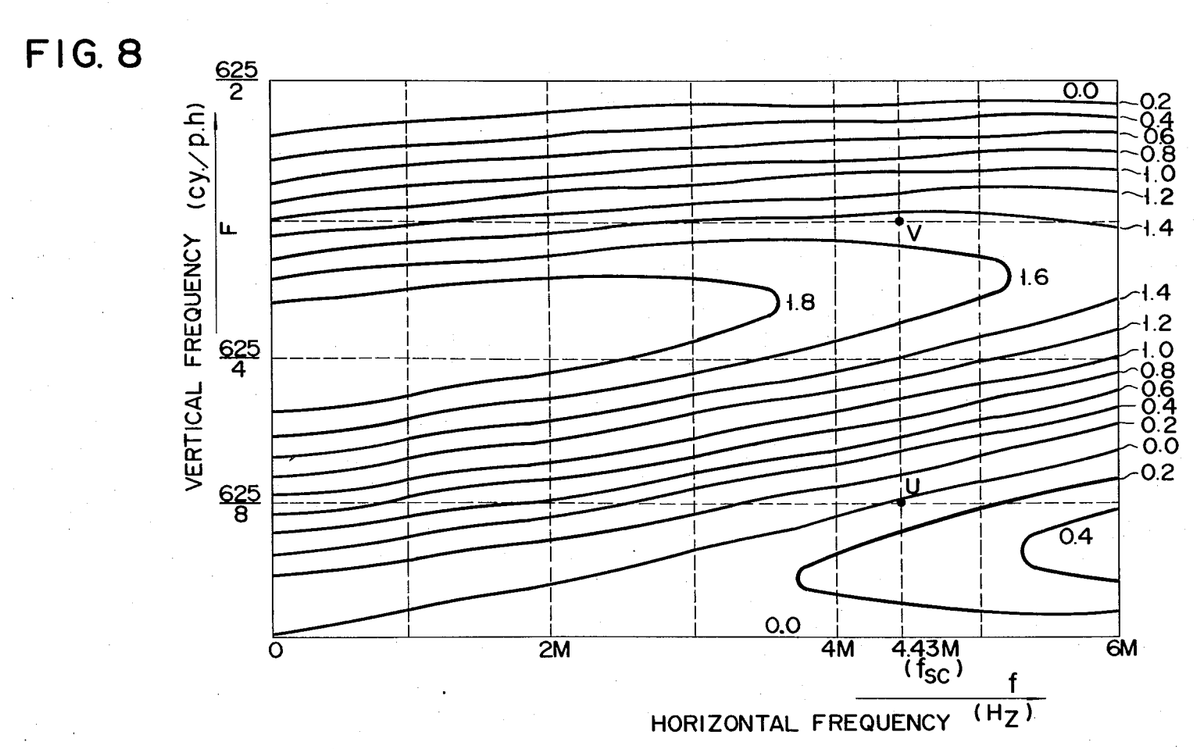

Gains with respect to the vertical and horizontal frequencies of the above comb filter portion are as shown in FIGS. 7 and 8, respectively. In FIGS. 7 and 8, black points are carrier frequencies (fsc, 625/8) and (fsc, 625×⅜) of the U and V signals, respectively, characteristics thereof are represented by equivalent gain curves, and their values (linear representation) are also shown. FIG. 7 shows that when the characteristic is at (fsc, 625/8), the gain is $\sqrt{2}$, and when at (fsc, 625×⅜), the gain is zero along the horizontal frequency axis. Thus, only the U signal can be separated from the video signal. On the other hand, FIG. 8 shows that when the characteristic is at (fsc, 625×⅜), the gain is $\sqrt{2}$, and when at (fsc, 625/8), the gain is zero along the horizontal frequency axis. Thus, only the V signal can be separated from the video signal. Note that since the characteristics greater than f=fsc along the horizontal frequency direction are attenuated by the band-pass filter 22 provided in a later stage, they need not be considered.

The band-pass filter 22 will be described hereinafter. The band-pass filter 22 consists of delay lines 22a, 22b, 22c and 22d respectively having a delay time of 2Ts, coefficient multipliers 22e, 22f, 22g, 22h and 22i, and an adder 22j, and a transfer function Hc-BPF(Z) and a frequency characteristic Hc-BPF(f) thereof are given as follows:

$$Hc\text{-}BPF(Z) = -(\tfrac{1}{8})Z^{-4} + (\tfrac{1}{4})Z^{-2} - (\tfrac{1}{4}) + (\tfrac{1}{4})Z^2 - (\tfrac{1}{8})Z^4 \quad (6)$$

$$Hc\text{-}BPF(f) = Hc\text{-}BPF(Z)|_{Z=\exp(-j2\pi fTs)}$$

$$= (\tfrac{1}{4}) + (\tfrac{1}{2})\cos(2\pi f/fsc) - (\tfrac{1}{4})\cos(\pi f/fsc)$$

where the center frequency is f=fsc.

In this manner, the frequency characteristic of the filter comprising a series circuit of the chrominance signal separation circuit and the band-pass filter 22 for separating the chrominance signal C is given by the following equation from equation (6):

$$Hc(F,f) = Hcomb(F) \cdot Hc\text{-}BPF(f) \quad \ldots (7)$$

The center frequency of this filter is (f,F)=(fsc,N/2). Note that Hcomb(F) is a characteristic of the comb filter portion including the multiplexer 21.

The luminance signal separation characteristic HY(F,f) is given as follows by using equation (7):

$$HY(F,f) = 1 - Hc(F,f) \quad \ldots (8)$$

Another embodiment of the present invention utilizing the delay device 13 will be described hereinafter.

Figure 9:
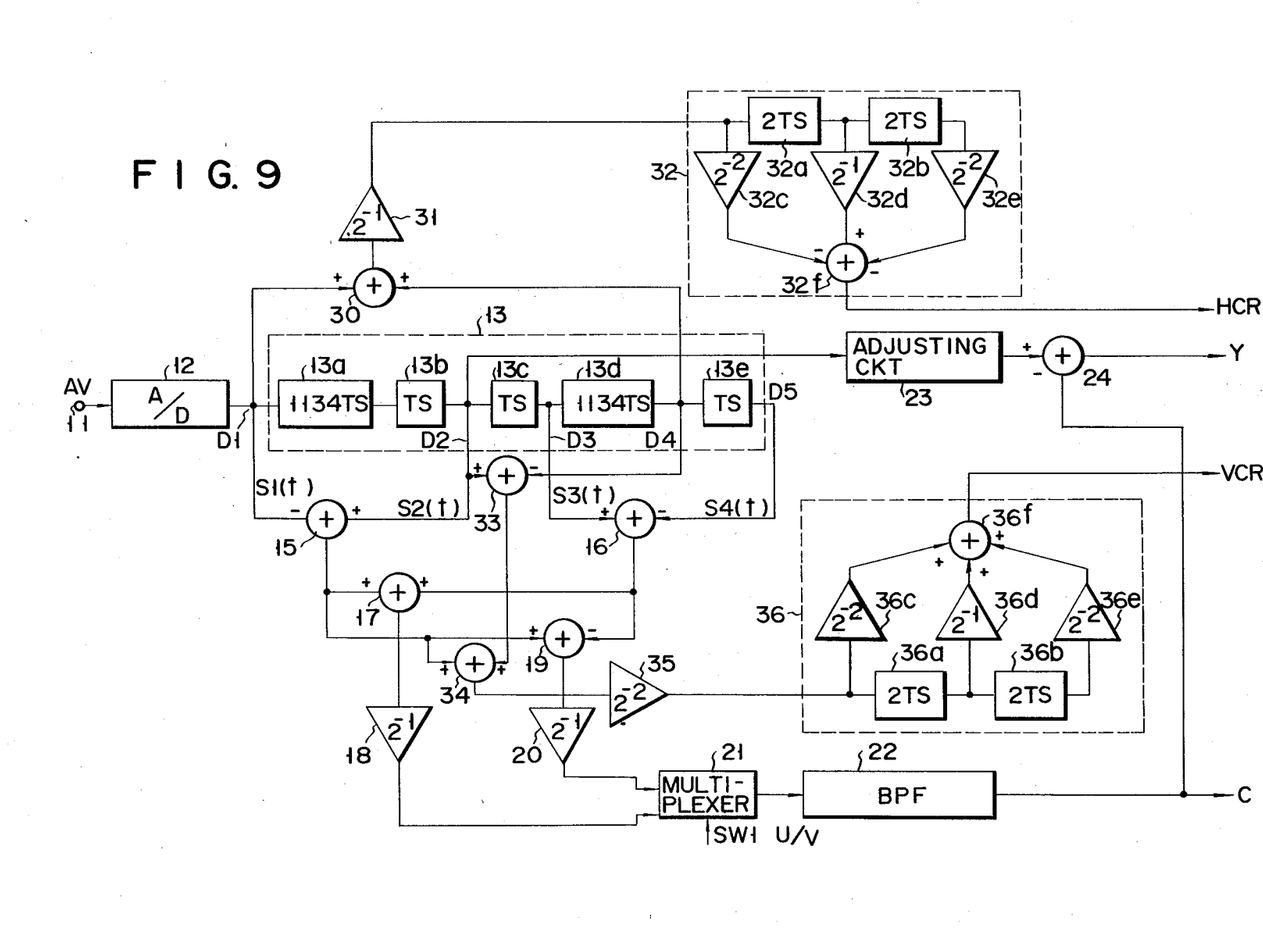
FIG. 9 is a circuit diagram showing a second embodiment of the present invention.

FIG. 9 shows an embodiment for obtaining a horizontal contour signal HCR and a vertical contour signal VCR. The same reference numerals in FIG. 9 denote the same parts in FIG. 1. In order to obtain the horizontal contour signal HCR, the video signals D1 and D4 are added by an adder 30. The sum from the adder 30 is multiplied by $2^{-1}$ and by a coefficient multiplier 31, and is then supplied to a band-pass filter 32. The band-pass filter 32 consists of delay lines 32a and 32b having a delay time of 2Ts, coefficient multipliers 32c, 32d and 32e and a calculator 32f.

A transfer function HPAL(ω) and a frequency characteristic HPAL(F) of the filter consisting of the adder 30 and the like are as follows:

$$HPAL(\omega) = (\tfrac{1}{2})(1 + \omega^{-2}) \quad (9)$$
$$= (\omega^{-1}/2)(\omega^{+1} + \omega^{-1})$$
$$HPAL(F) = H(\omega)|_{\omega=\exp(-j2\pi F/Fs)} \quad (10)$$
$$= (\tfrac{1}{2})|\cos(2\pi F/N)|$$

The horizontal contour filter is a low-pass filter having a pass band from a DC component to N/6 (cy./p.h.) component along the axis of vertical frequency. The output from the filter portion is supplied to the band-pass filter 32. A transfer function HBPF(Z) and a frequency characteristic HBPF(f) of the band-pass filter 32 are as follows:

$$HBPF(Z) = -(\tfrac{1}{4}) + (\tfrac{1}{2})Z^{-2} - (\tfrac{1}{4})Z^{-4} \quad (11)$$
$$= (\tfrac{1}{4})Z^{-1}\{-(\tfrac{1}{2})Z^{+2} + 1 - (\tfrac{1}{2})Z^{-2}\}$$
$$HBPF(f) = HBPF(Z)|_{Z=exp(j2\pi f/Ts)} \quad (12)$$
$$= (\tfrac{1}{4})\{1 - \cos(4\pi f/fs)\}$$
$$= (\tfrac{1}{4})\{1 - \cos(\pi f/fsc)\}$$

In the filter 32, a gain of the center frequency is 1. Therefore, a filter comprising a series circuit of the above comb filter and the band-pass filter 32 for separating the horizontal contour signal HCR has a frequency characteristic HH(F,f) as follows:

$$HH(F,f) = HPAL(F) \cdot HBPF(f) \ldots (13)$$

The center frequency of this filter is (f,F)=(fsc,0).

The vertical contour signal VCR is derived by a subtracter 15 for calculating the video signals D1 and D2, a subtracter 33 for calculating the video signals D2 and D4, an adder 34 for adding the outputs from the subtracters 15 and 33, a coefficient multiplier 35 for multiplying by $\tfrac{1}{4}$ the output from the adder 34, and a low-pass filter 36 to which the output from the coefficient multiplier 35 is supplied. The low-pass filter 36 consists of delay lines 36a and 36b having a delay time of 2Ts, coefficient multipliers 36c, 36d and 36e and an adder 36f. A transfer function HLPF(Z) and a frequency characteristic HLPF(f) of the low-pass filter 36 are as follows:

$$HLPF(Z) = (\tfrac{1}{4}) + (\tfrac{1}{2})Z^{-2} + (\tfrac{1}{4})Z^{-4} \quad (14)$$
$$= (\tfrac{1}{4})Z^{-2}\{(Z^{+2}/2) + 1 + (Z^{-2}/2)\}$$
$$HLPF(f) = HLPF(Z)|_{Z=exp(j2\pi f/Ts)} \quad (15)$$
$$= (\tfrac{1}{2})\{1 + \cos(4\pi f/fs)\}$$
$$= (\tfrac{1}{2})\{1 + \cos(\pi f/fsc)\}$$

This filter has a passband from a DC component to ($\tfrac{1}{2}$)fsc(Hz). Therefore, a filter comprising a series circuit of the chrominance signal separation filter portion of the comb filter portion and the low-pass filter 36 for separating the vertical contour signal VCR has a frequency characteristic HV(F,f) as follows:

$$HV(F,f) = (\tfrac{1}{2})Hcomb(F) \cdot HLPF(f) \ldots (16)$$

This filter has a center frequency of (f,F) =(0, N/2), and the vertical contour signal VCR obtained therefrom includes a signal component which varies widely along the vertical direction.

Figure 10:
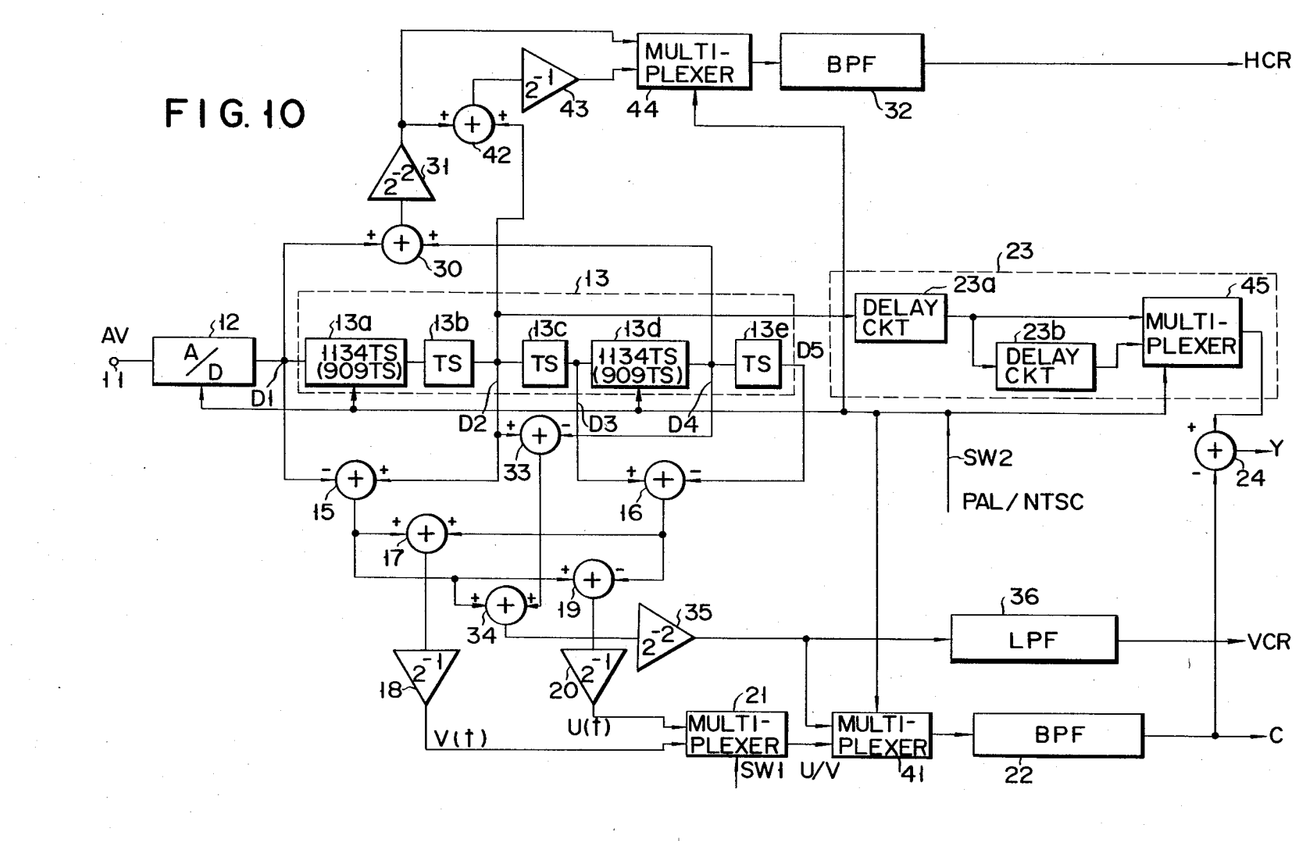
FIG. 10 is a circuit diagram showing a third embodiment of the present invention.

Furthermore, as shown in FIG. 10, the apparatus according to the present invention can easily process signals of not only the PAL system, but also the NTSC system by adding a required circuit.

Note that the same reference numerals in FIG. 10 denote the same parts as in FIGS. 1 and 9. When an analog video signal AD of the NTSC system is supplied, a PAL/NTSC switching signal SW2 is also supplied so as to switch to the NTSC mode. The switching signal SW2 is supplied to an A/D converter 12, delay circuits 13a and 13d, and multiplexers 41, 44 and 45. A frequency of a sampling clock of the A/D converter 12 is set at 4 times a color subcarrier frequency fsc of the NTSC system, and a phase thereof is fixed at $\pm Q$ and $\pm I$ axis of a color burst. A delay time of the delay circuits 13a and 13d is set at 909 Ts (Ts=$\tfrac{1}{4}$fsc; sampling period). The multiplexer 41 selectively produces an output of a coefficient multiplier 35. The multiplexer 44 selectively supplies an output of a coefficient multiplier 43 to a band-pass filter 32. The multiplexer 45 selectively supplies an output of an adjusting delay line 23a to a subtracter 24.

A portion added in FIG. 10 to the circuit shown in FIG. 9 includes an adder 42 for adding a digital video signal D2 and an output from a coefficient multiplier 31, a coefficient multiplier 43 for multiplying by $\tfrac{1}{2}$ the output from the adder 42 and then supplying the product to the multiplexer 44, a line for supplying the output from the coefficient multiplier 35 to the multiplexer 41, and a line for supplying the switching signal SW2 to the multiplexers 41, 44 and 45.

The A/D converter 12 samples the analog video signal AV with a sampling clock having a period of Ts and a phase which coincides with the $\pm I$ and $\pm Q$ axis so as to generate a digital video signal D1. The signal D1 is supplied to the delay device 13. The 1H delay circuits 13a and 13d have a delay time of 909Ts, and the delay lines 13b, 13c and 13e have a delay time of Ts. Therefore, video signals D2 and D4 which are respectively delayed by 910Ts and 1820Ts (910×2Ts) with respect to the digital video signal D1 are obtained. A chrominance signal separation circuit comprises a subtracter 15 for receiving the video signals D1 and D2, a subtracter 33 for receiving the video signals D2 and D4, an adder 34 for receiving the outputs from the subtracters 15 and 33, the coefficient multiplier 35 and the like. The chrominance signal separation circuit of the comb filter type can perform chrominance signal separation and can obtain a vertical contour signal VCR. It should be noted that coefficient multiplication can be performed by a digit shift by means of a simplified wiring configuration.

A transfer function Hcomb($\omega$) and a frequency characteristic Hcomb(F) of the chrominance signal separation circuit of the comb filter type are expressed as follows:

$$Hcomb(\omega) = (\tfrac{1}{2}^2)\{(-1 + \omega^{-1}) + (\omega^{-1} - \omega^{-2})\}$$
$$= (\omega^{-1}/2)\{-(\omega/1) + 1 - (\omega^{-1}/2)\}$$
$$\text{and } (\omega^{-1} = exp(j2\pi F/Fs))$$
$$Hcomb(F) = Hcomb(\omega)|_{\omega=exp(j2\pi F/Fs)}$$
$$= (\tfrac{1}{2})\{1 - \cos(2\pi F/N)\}$$

Figures 11, 13:
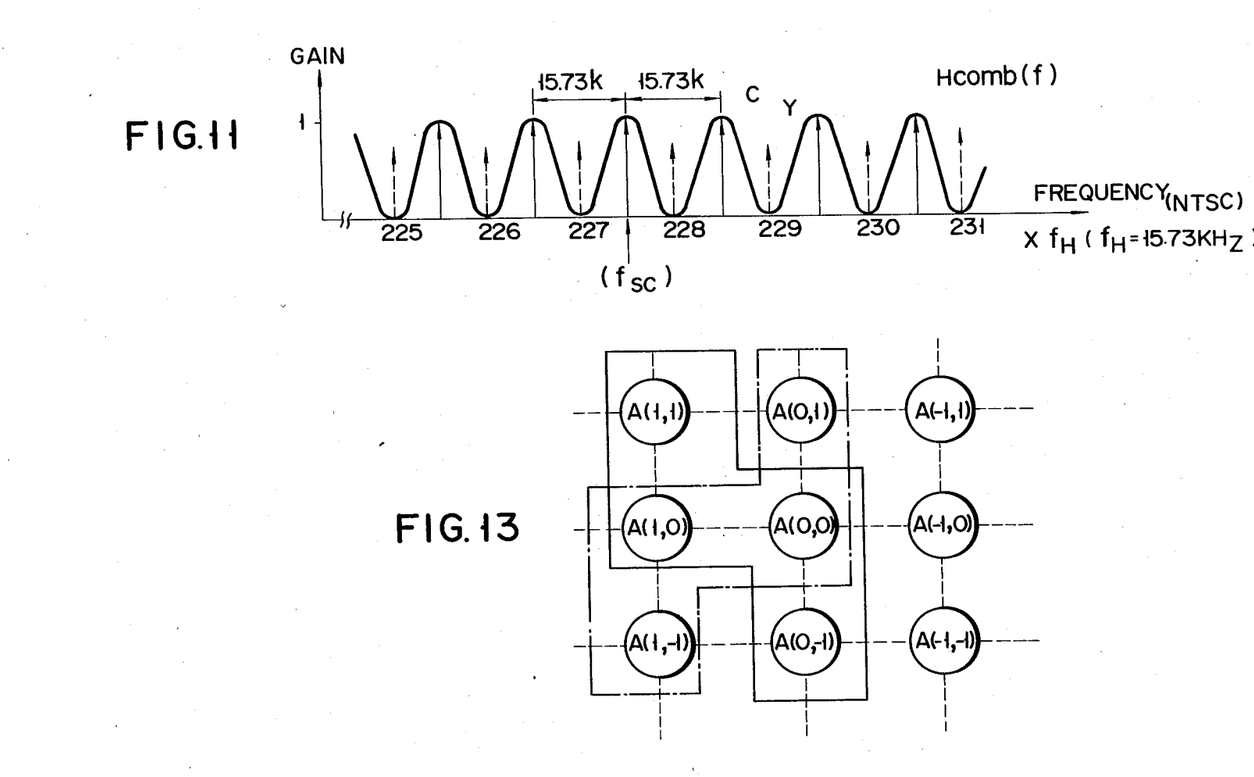
FIG. 11 is a graph showing frequency characteristics of a comb filter portion of a circuit according to the present invention in an NTSC mode.
FIG. 13 is a diagram showing another example of vertical correlation utilized when hue correction is performed by the circuit of the present invention.

The filter separates the chrominance signal (having a frequency of about $f=(n\pm(\tfrac{1}{2}))fH$), and has a characteristic shown in FIG. 11. The frequency characteristic is Hcomb(nfH)=0 and Hcomb{(n±($\tfrac{1}{2}$))fH}=1, and is point-symmetrical at a frequency of $f=(n+(\tfrac{1}{4}))fH$. Therefore, this results in satisfactory Y/C separation.

The separated chrominance signal is received by the band-pass filter 22. A characteristic of the band-pass filter 22 has been described with reference to equations (6) and (7). The digital video signal D2 delayed by 910Ts with respect to the signal D1 is subjected to time-base adjustment with the chrominance signal C by the adjusting delay circuit 23a, and is supplied to the subtracter 24 through the multiplexer 45. The subtracter 24 also receives the chrominance signal C, thus obtaining a luminance signal Y.

An operation for obtaining the vertical contour signal VCR and the horizontal contour signal HCR will be described hereinafter. In order to obtain the vertical contour signal VCR, the output from the coefficient multiplier 35 is supplied to a low-pass filter 36. Since the frequency characteristic of this filter has been explained with reference to equations (14), (15) and (16), an explanation thereof is omitted.

In order to obtain the horizontal contour signal HCR, a transfer function $HNTSC(\omega)$ and a frequency characteristic HNTSC(F) of the filter consisting of the adders 30 and 42 and the coefficient multipliers 31 and 43 are expressed as follows:

$$HNTSC(\omega) = (\tfrac{1}{2})\{(\tfrac{1}{2}) + \omega^{-1} + (\tfrac{1}{2})\omega^{-2}\} \quad (17)$$
$$= (\omega^{-1}/2)\{(\tfrac{1}{2})\omega^{+1} + 1 + (\tfrac{1}{2})\omega^{-1}\}$$
$$(\omega^{-1} = \exp(j2\pi F/Fs))$$
$$HNTSC(F) = H(\omega)|_{\omega=\exp(-j2\pi F/Fs)}$$
$$= (\tfrac{1}{2})\{1 + \cos(2\pi F/N)\}$$

The filter is a low-pass filter having a passband from a DC component to N/4 (cy./p.h.) along the vertical frequency direction. The contour signal derived by this filter is supplied to the band-pass filter 32. The transfer function HBPF(Z) and the frequency characteristic HBPF(f) of the band-pass filter 32 have been explained in equations (11) and (12). Therefore, a frequency characteristic HH(F,f) obtained by serially connecting the horizontal contour filter in the comb filter portion with the band-pass filter 32 is expressed as follows:

$$HH(F,f) = HNTSC(F) \cdot HBPF(f) \quad \ldots (18)$$

Figure 12:
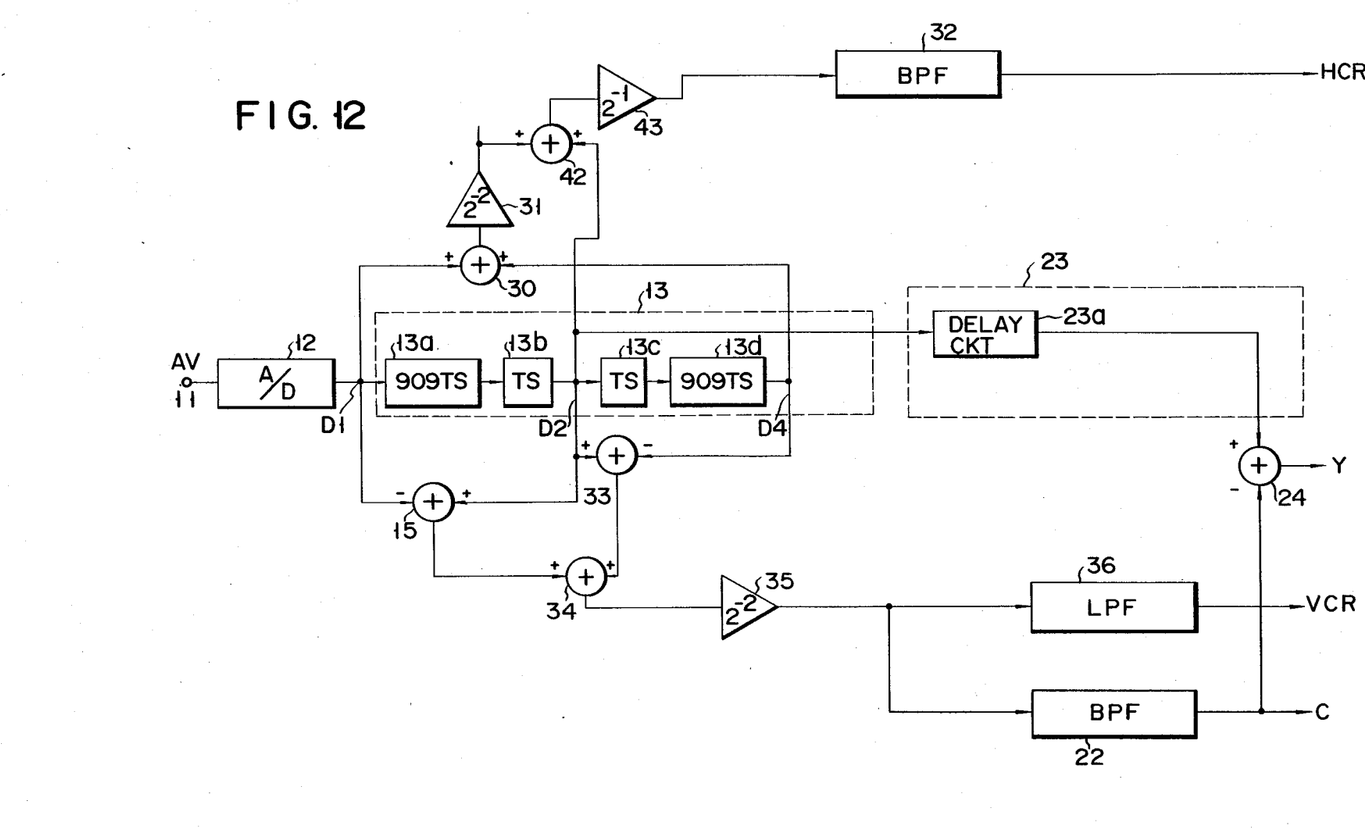
FIG. 12 is a circuit diagram showing a fourth embodiment of the present invention.

FIG. 12 is a diagram illustrating a circuit which only possesses an NTSC signal. Since the same reference numerals in FIG. 12 denote the same parts as in FIG. 10, a detailed description thereof is omitted.

FIG. 13 shows vertical correlation for PAL hue correction. In order to perform PAL hue correction, first, vertical correlation is obtained and then the U and V signals are separated. In the embodiment shown in FIG. 1, vertical correlation indicated by a solid line in FIG. 13 is obtained. However, vertical correlation indicated by an alternate long and short dashed line can also be adopted. FIG. 13 is a representation in which the video signals D1, D2, D3 and D5 in FIG. 1 correspond to pixels on a screen. The video signals D1, D2, D3 and D5 respectively correspond to pixels A(0,−1), A(0,0), A(1,0) and A(1,1). In FIG. 13, the video signals corresponding to horizontally adjacent pixels have a delay time Ts, and the video signals corresponding to vertically adjacent pixels have a delay time 1H.

The U and V signals are obtained in the following manner.

In order to obtain the U signal, any of the following equations can be used with respect to the pixel A(0,0):

$$Au = (\tfrac{1}{2})\{-A(0,1) + A(0,0) - A(-1,0) + A(-1,-1)\}$$

or $$Au = (\tfrac{1}{2})\{-A(0,1) + A(1,0) + A(0,0) - A(1,-1)\}$$

or $$Au = (\tfrac{1}{2})\{-A(-1,1) + A(0,0) + A(-1,0) - A(0,-1)\}$$

or $$Au = (\tfrac{1}{2})\{A(1,1) - A(1,0) + A(0,0) - A(0,-1)\}$$

As for the characteristic of the U signal, the gain is zero at (f,F)=(fsc,0), $\sqrt{2}$ at (f,F)=(fsc,N/8), and zero at (f,F)=(fsc,($\tfrac{3}{8}$)N).

In order to obtain the V signal, any of the following equations can be used with respect to the pixel A(0,0):

$$Av = (\tfrac{1}{2})\{-A(0,1) + A(0,0) + A(-1,0) - A(-1,-1)\}$$

or $$Av = (\tfrac{1}{2})\{-A(0,1) - A(1,0) + A(0,0) + A(1,-1)\}$$

or $$Av = (\tfrac{1}{2})\{A(-1,1) + A(0,0) - A(-1,0) - A(0,-1)\}$$

or $$Av = (\tfrac{1}{2})\{-A(1,1) + A(1,0) + A(0,0) - A(0,-1)\}$$

As for the characteristic of the V signal, the gain is zero at (f,F)=(fsc,0) and (fsc,N/8), and $\sqrt{2}$ at (f,F)=(fsc,($\tfrac{3}{8}$)N). For this reason, in order to separate the U and V signals, a point for deriving the digital video signal from the delay device 13 can be determined by various methods.

Therefore, the calculation for obtaining the first chrominance signal Cu (U signal) is as follows:

$$Cu = Au\{-V(n0-1135) + V(n0) - V(n0+1) + V(n0+1136)\}$$

where V(n) is the digital video signal delayed by nTs by the delay device, n0 is a predetermined integer, and Au is an arbitrary constant:

or $$Cu = Au\{V(n0-1136) - V(n0-1) + V(n0) - V(n0+1135)\}$$

or $$Cu = Au\{-V(n0-1135) + V(n0-1) + V(n0) - V(n0+1134)\}$$

or $$Cu = Au\{-V(n0-1134) + V(n0) + V(n0+1) - V(n0+1135)\}$$

In order to obtain the second chrominance signal Cv (V signal), the following calculation is performed:

$$Cv = Av\{-V(n-1135) - V(n-1) + V(n0) + V(n0+1134)\}$$

where V(n) is the digital video signal delayed by nTs (by the delay device), n0 is a predetermined integer, and Av is an arbitrary constant: or $$Cv = Av\{V(n0-1134) + V(n0) - V(n0+1) - V(n0+1135)\}$$

or $$Cv = Av\{-V(n0-1135) + V(n0) + V(n0+1) - V(n0+1136)\}$$

or $$Cv = Av\{-V(n0-1136) + V(n0-1) + V(n0) - V(n0+1135)\}$$

As described above, according to the present invention, the delay device 13 is multifunctional.

In the PAL mode, the delay device 13 is used both as a Y/C separation circuit and for hue correction. Therefore, no separate hue correction circuit is needed and the cost of a digital television receiver can be reduced.

Furthermore, by utilizing the delay device 13, signals for vertical and horizontal contour correction can be easily obtained. This allows not only good Y/C separation and low cost hue correction, but also a television receiver which can provide images with clear contours.

By adding a switching circuit, an adder and the like, signals of both the PAL and NTSC systems can be easily processed. In the case when the overall circuit is constituted by an IC, even if these additional circuits are added, the increase in manufacturing cost is relatively low. In both the PAL and NTSC systems, the circuit is preferably manufactured as a single IC. Therefore, only one product line is required, thus keeping manufacturing costs low.

What is claimed is:

1. A digital television signal processing circuit comprising:
    an analog/digital converter for converting an analog video signal into a digital video signal, said analog/digital converter sampling the analog video signal at a predetermined period (Ts) and at a timing in synchronism with ±U and ±V phrases so as to convert the analog video signal into the digital video signal when an analog signal of a PAL system is supplied thereto;
    a delay device for delaying the digital video signal, said delay device being connected to said analog/digital converter and generating a delay signal which is delayed by at least two horizontal scanning periods said scanning period being a multiple of said predetermined periods (Ts);
    a first operation means for outputting a first chrominance signal Cu obtained by calculation and coefficient multiplication, said first operation means being coupled to said delay device and receiving therefrom a plurality of digital video signals, each having different delay times, and calculating and coefficient-multiplying the plurality of digital video signals by a frequency characteristic Fu(f) satisying Fu(fsc)=Ku, Fu{fsc+($\frac{1}{2}$)fH}=0, and Fu{fsc+($\frac{1}{4}$)fH}=0 (where fH is a horizontal scanning frequency, Ku is a constant which is not zero, and fsc is a color subcarrier frequency);
    a second operation means for outputting a second chrominance signal Cv obtained by calculation and coefficient multiplication, said second operation means being coupled to a plurality of portions of said delay device and receiving therefrom a plurality of digital video signals, each having different delay times, and calculating and coefficient-multiplying the plurality of digital video signal by a frequency characteristic Fv(f) satisfying Fv(fsc)=0, Fv{fsc+($\frac{1}{2}$)fH}=Kv, and Fv{fsc+($\frac{1}{4}$)fH}=0 (where Kv is a constant which is not zero); and
    a multiplexer for multiplexing a third chrominance signal using the first and second chrominance signals Cu and Cv, said multiplexer being connected to said first and second operation means, and selectively generating the first and second chrominance signals Cu and Cv.

2. A composite PAL television signal decoder comprising:
    analog/digital converter means for converting an analog PAL video signal into a first digital video signal in response to a sampling clock signal whose period is one quarter of a period of a color subcarrier and whose phase coincides with ±U and ±V axis phases of a color burst;
    delay means for delaying said first digital video signal;
    means for extracting a second digital video signal from said delay means, a delay between said first and second digital video signals being a time of one horizontal line;
    means for extracting a third digital video signal from said delay means, a delay between said second and third digital video signals being a time of one sampling clock period;
    means for extracting a fourth digital video signal from said delay means, a delay between said third and fourth digital video signals being a time of one horizontal line;
    operation means for mixing said first through fourth digital video signals to separate first and second chrominance signals from said first through fourth digital video signals, said first and second digital video signals being given different operation signs and said third and fourth digital video signals being given different operation signs when an arithmetic operation is performed on said first through fourth digital video signals.

3. A decoder according according to claim 2, further comprising:
    multiplexer means for multiplexing the first and second chrominance signals Cu and Cv to produce a third chrominance signal, said multiplexer means being connected to said operation means, and for selectively selecting the first and second chrominance signals Cu and Cv.

4. A decoder according to claim 2, further comprising:
    multiplexer means for multiplexing the first and second chrominance signals Cu and Cv to produce a third chrominance signal, said multiplexer means being connected to said operation means, and for selectively selecting the first and second chrominance signals Cu and Cv; and
    first band-pass filter means for removing an undesirable component from the third chrominance signal, said first band-pass filter means being connected to said multiplexer means and delivering a fourth chrominance signal which is hue-corrected.

5. A decoder according to claim 2, further comprising:
    multiplexer means for multiplexing the first and second chrominance signals Cu and Cv to produce a third chrominance signal, said multiplexer means being connected to said operation means, and for selectively selecting the first and second chrominance signals Cu and Cv;
    first band-pass filter means for removing an undesirable component from the third chrominance signal, said first band-pass filter means being connected to said multiplexer means, and for delivering a fourth chrominance signal which is hue-corrected; and
    calculating means for obtaining a luminance signal, said calculating means being connected to said first band-pass filter means and said delay means and for subtracting the fourth chrominance signal from the digital video signal from said delay means.

6. A decoder according to claim 2, wherein said period Ts of the sampling clock signal is ¼ a color subcarrier period Tsc (i.e., Ts=¼Tsc); and
  said operation means includes means for performing any of the following equations to obtain said first chrominance signal;
  (i) $Cu = Au\{-V(n0-1135) + V(n0) - V(n0+1) + V(n0+1136)\}$ where V(n) is the digital video signal delayed by nTs by said delay means, n0 is a predetermined integer, and Au is an arbitrary constant: and
  (ii) $Cu = Au\{-V(n0-1136) - V(n0-1) + V(n0) - V(n0+1135)\}$ and
  (iii) $Cu = Au\{-V(n0-1135) + V(n0-1) + V(n0) - V(n0+1134)\}$
  and
  (iv) $Cu = Au\{-V(n0-1134) + V(n0) + V(n0+1) - V(n0+1135)\}$.

7. A decoder according to claim 2, wherein said predetermined period Ts of the sampling clock signal is ¼ a color subcarrier period Tsc (i.e., Ts =(1/4Tsc); and wherein
  said operation means includes means for performing any of the following equations to obtain said second chrominance signal Cv:
  (i) $Cv = Av\{-V(n0-1135) - V(n0-1) + V(n0) + V(n0+1134)\}$ where V(n) is the digital video signal delayed by nTs by said delay device, n0 is a predetermined integer, and Av is an arbitrary constant: and
  (ii) $Cv = Av\{V(n0-1134) + V(n0) - V(n0+1) - V(n0+1135)\}$ and
  (iii) $Cv = Av\{-V(n0-1135) + V(n0) + V(n0+1) - V(n0+1136)\}$ and
  (iv) $Cv = Av\{-V(n0-1136) + V(n0-1) + V(n0) - V(n0+1135)\}$.

8. A decoder according to claim 2, further comprising:
  first means for producing a horizontal contour signal, said first means having first calculating means connected to said delay means, a first coefficient multiplier connected to an output terminal of said first calculating means, and a second band-pass filter connected to an output terminal of said first coefficient multiplier.

9. A digital television signal processing circuit according to claim 2, further comprising:
  second means for producing a vertical contour signal, said second means having second calculating means connected to said delay means, a second coefficient multiplier connected to an output terminal of said second calculating means, and a first low-pass filter connected to an output terminal of said second coefficient multiplier.

10. A device according to claim 2, further comprising:
  switching means for changing the frequency of said sampling clock when an NTSC system signal is supplied to said to said analog/digital converter means.

11. A digital television signal processing circuit comprising:
  an analog/digital converter for converting an analog video signal to a digital video signal;
  a delay device connected to said analog/digital converter, for delaying the digital video signal, and generating a delay signal which is delayed by at least two horizontal scanning periods, the delay being a multiple of a predetermined period Ts, said delay device having a delay time thereof according to one of the analog video signal of a PAL system and an NTSC system; and
  operation means coupled to said delay device, for receiving therefrom a plurality of digital video signals each having different delay times and outputting an NTSC format chrominance signal obtained by calculation and coefficient multiplication.

* * * * *